(12) United States Patent
Turner et al.

(10) Patent No.: US 6,474,261 B1
(45) Date of Patent: *Nov. 5, 2002

(54) POULTRY FEEDER WITH FEED CONVEYOR CONTROL SYSTEM

(75) Inventors: Mark R. Turner, Coldwater, OH (US); Douglas S. Bertke, Coldwater, OH (US)

(73) Assignee: Val-Co Pax, Inc., Coldwater, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/837,099

(22) Filed: Apr. 18, 2001

(51) Int. Cl.[7] ............................................... A01K 39/01
(52) U.S. Cl. ........................................ 119/53; 119/57.4
(58) Field of Search ...................... 119/53, 57.4, 57.7, 119/57.5, 57, 57.1

(56) References Cited

U.S. PATENT DOCUMENTS

| | | | | |
|---|---|---|---|---|
| 3,330,255 A | | 7/1967 | Scott et al. | |
| 3,490,419 A | * | 1/1970 | Van Huis | 119/53 |
| 4,348,988 A | * | 9/1982 | Lawson | 119/53 |
| 4,476,811 A | * | 10/1984 | Swartzendruber | 119/53 |
| 4,552,095 A | * | 11/1985 | Segalla | 119/53 |
| 4,676,197 A | * | 6/1987 | Hoover | 119/54 |
| 5,007,380 A | * | 4/1991 | Badia et al. | 119/53 |
| 5,092,274 A | * | 3/1992 | Cole et al. | 119/53 |
| 5,101,766 A | * | 4/1992 | Runion | 119/53 |
| 5,113,797 A | * | 5/1992 | van Daele | 119/53 |
| 5,406,907 A | * | 4/1995 | Hart | 119/53 |
| 5,462,017 A | * | 10/1995 | Pollock et al. | 119/53 |
| 5,497,730 A | * | 3/1996 | van Daele et al. | 119/53 |
| 5,724,912 A | * | 3/1998 | Cull | 119/57.2 |
| 5,762,021 A | * | 6/1998 | Horwood et al. | 119/52.1 |
| 5,765,503 A | * | 6/1998 | van Daele | 119/52.4 |
| 5,794,562 A | * | 8/1998 | Hart | 119/52.4 |
| 5,875,733 A | * | 3/1999 | Chen | 119/53 |
| 5,884,581 A | * | 3/1999 | Vandaele | 119/52.4 |
| 6,050,220 A | | 4/2000 | Kimmel et al. | |

* cited by examiner

Primary Examiner—Charles T. Jordan
Assistant Examiner—Judith A. Nelson
(74) Attorney, Agent, or Firm—Jacox, Meckstroth & Jenkins

(57) ABSTRACT

A poultry feeder includes a drop tube which attaches to a horizontal feed distribution or conveyor tube enclosing an auger driven by a motor and gear reducer unit. The feeder includes a feed pan and grill assembly mounted on the drop tube for relative vertical movement, and an annular feed level control member is supported above the feed pan for relative vertical movement by an actuator sleeve. A feed conveyor control unit includes a base housing recessed within a center portion of the pan and supports a spring biased inverted cone member covered by a flexible diaphragm for sensing the weight of feed supported within the center portion of the feeder. The cone has a center plunger or stem which carries an adjustable metal actuator screw positioned to actuate an inductive type proximity switch or sensor connected to control the drive motor for the auger drive unit.

20 Claims, 2 Drawing Sheets

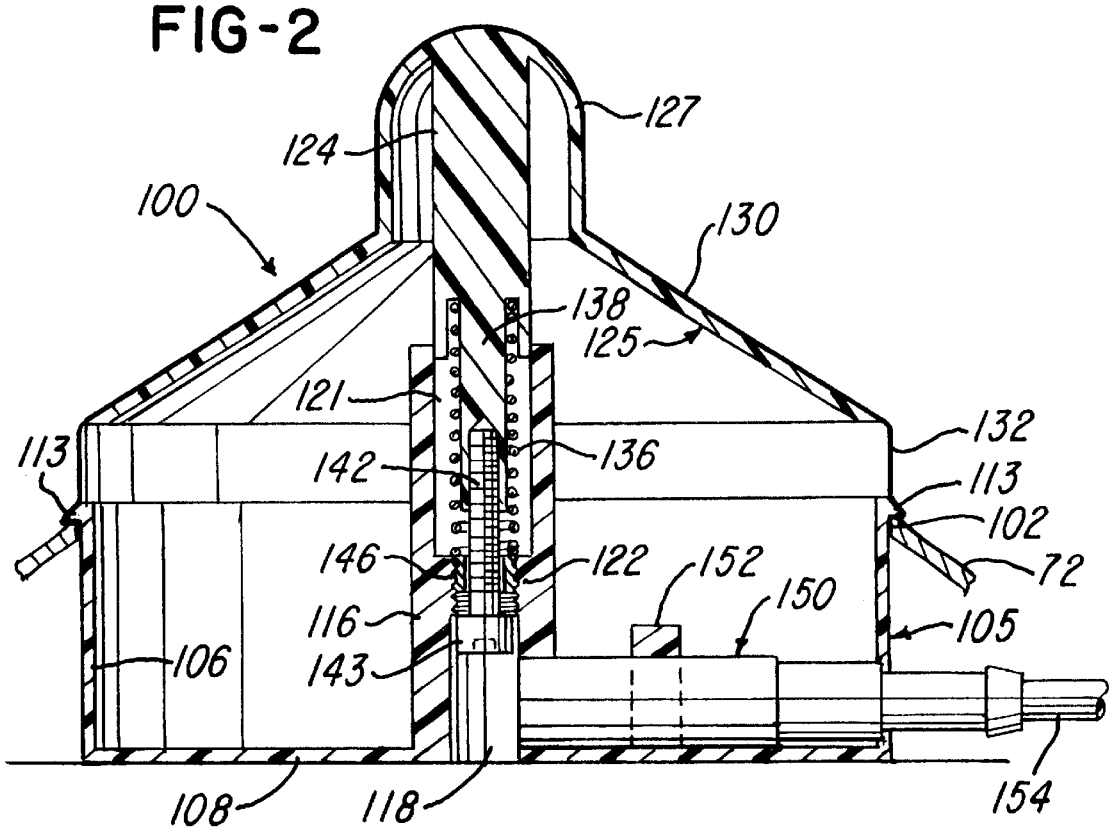
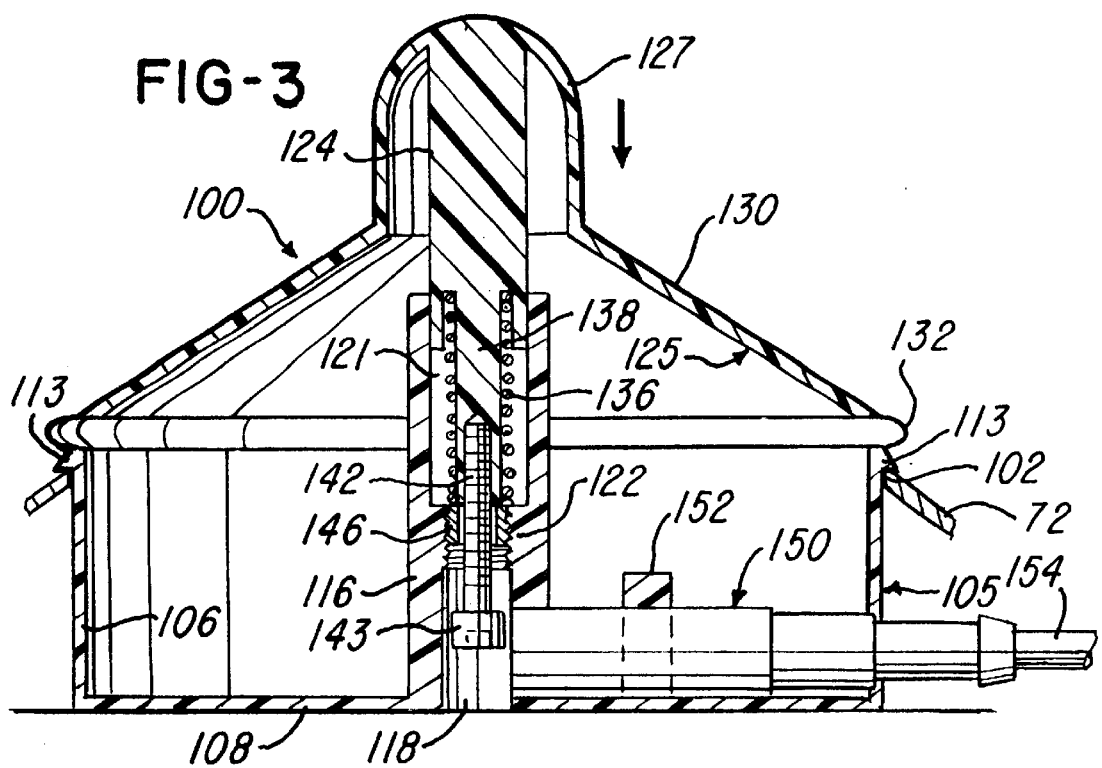

POULTRY FEEDER WITH FEED CONVEYOR CONTROL SYSTEM

BACKGROUND OF THE INVENTION

This invention relates to poultry feeders with adjustable feed levels and of the general type disclosed in U.S. Pat. No. 6,050,220 which issued to the assignee of the present invention and also disclosed in the references cited in the '220 patent. The invention also relates to a system or unit which controls the distribution of feed from a feed supply hopper through a horizontal conveyor or distribution tube enclosing an auger driven by an electric motor and gear reducer unit, such as, for example, the feed distribution system disclosed in U.S. Pat. No. 3,330,255. As shown in this '255 patent, the poultry feed is conveyed from a feed supply hopper 10 through a horizontal feed distribution tube or line 11 to a series of feeder pans 12 spaced along the feed distribution tube or line. The feed line or tube encloses a helical feed screw or auger 32 driven by an electric motor and gear reducer unit 33.

In such a feed distribution system, it is common to control the auger drive motor with a paddle actuated switch mounted on the drop tube of the feeder pan located at the end of the feed distribution line, opposite the feed supply hopper. For example, the '255 patent discloses in FIG. 10 a feed sensing switch 37 and a pivotal actuating paddle or flap 65. When feed builds up in the drop tube, the pressure or force from the feed pushes against the paddle or flap which actuates the switch 37 to shut off the drive motor 33 for the auger 32 within the feed distribution tube or line 11. Capacitive type proximity switches or sensors have also been used to sense a build up of feed within the drop tube, but the switches are not reliable, usually due to an accumulation of feed on the lens of the sensor and do not provide for convenient and precise adjustment.

SUMMARY OF THE INVENTION

The present invention is directed to a poultry feeder having an improved control system or unit which is more sensitive and reliable than previously used feeder control systems and which is also conveniently adjustable and constructed to provide high durability and resistance to the conditions of dust and humidity commonly found in a poultry or broiler feeder house. In accordance with a preferred embodiment of the invention, a poultry feeder is constructed as disclosed in above mentioned U.S. Pat. No. 6,050,220. The feeder incorporates a control unit within the bottom pan of the feeder for controlling the motor which drives the auger within the horizontal feed distribution or conveyor tube for delivering feed to a plurality or series of poultry feeders connected to the tube at longitudinally spaced intervals. The illustrated control unit incorporates a cylindrical base housing which is recessed within a center hole of the feeder pan and supports an inverted cone member for slight vertical movement relative to the housing. The cone member is biased upwardly by a spring and is covered by a flexible rubber-like diaphragm having a skirt portion which is pinched between the pan and the housing.

The cone member has a downwardly projecting center plunger or stem which carries a metal actuator screw, and the screw head operates an inductive type proximity switch enclosed within the housing and connected to control the motor for the auger within the feed conveyor tube. The inverted cone member senses the weight of the feed on the cone member and moves downwardly relative to the base housing. When the head of the metal actuator screw is sensed by the proximity sensor or switch, the switch shuts off the auger drive motor. The housing and the actuator cone are molded of a rigid plastics material, and the metal actuator screw is adjustable within the center stem of the cone member for precisely selecting the weight of feed necessary to actuate the proximity sensor.

Other features and advantages of the invention will be apparent from the following description, the accompanying drawings and the appended claims.

BRIEF DESCRIPTION OF THE DRAWINGS

FIG. 2 is an enlarged axial section of the control unit shown in FIG. 1 and before the control unit is actuated by the weight of feed on the control unit; and FIG. 3 is a section similar to FIG. 2 and illustrating the control unit actuated by a predetermined weight of feed supported by the control unit.

DESCRIPTION OF THE PREFERRED EMBODIMENT

Figure 1:
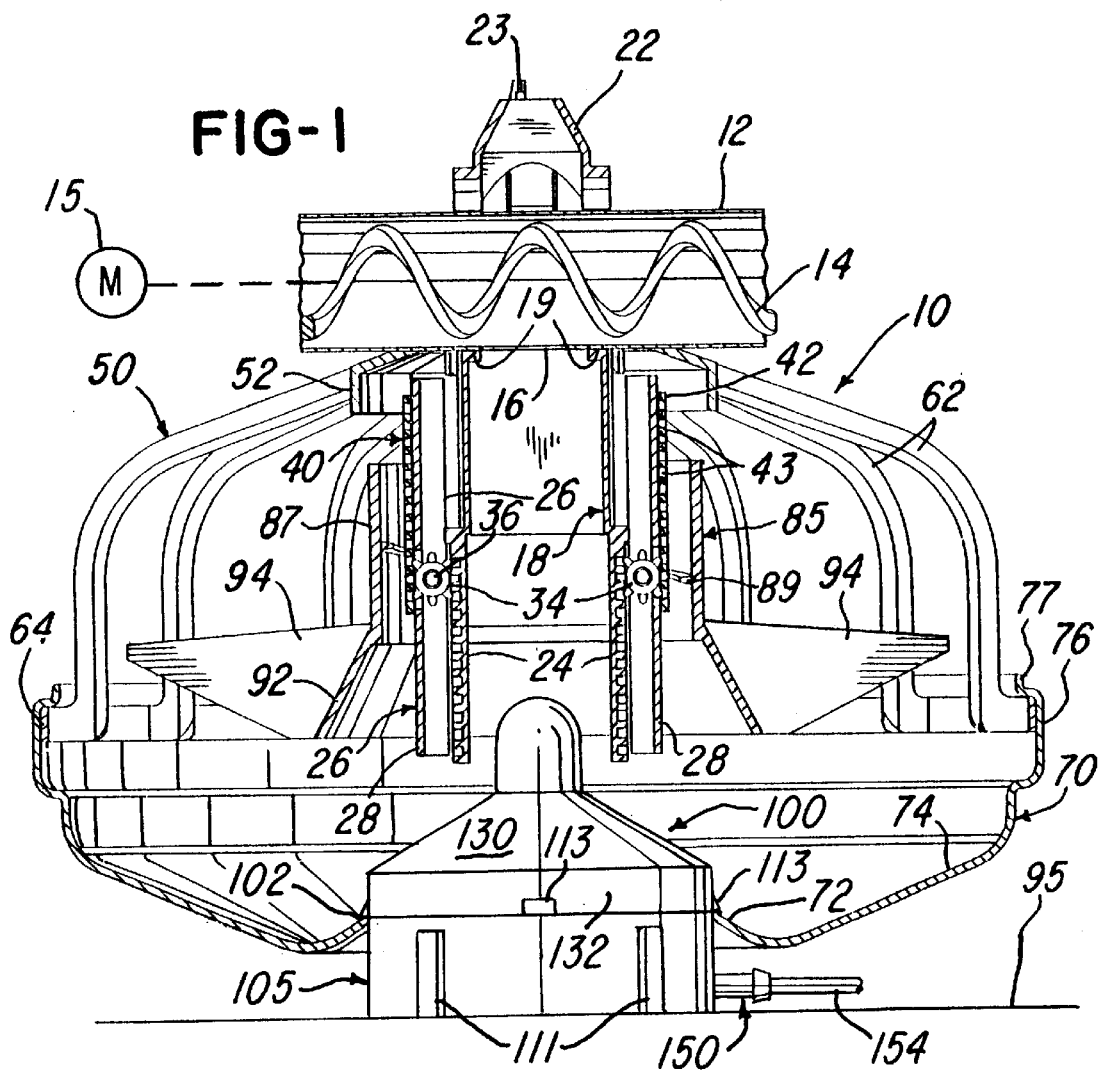
FIG. 1 is a vertical section of a feed distribution or conveyor tube and a poultry feeder incorporating a control unit constructed in accordance with the invention.

A poultry feeder 10 is shown in FIG. 1 and is constructed as disclosed in above mentioned U.S. Pat. No. 6,050,220, the disclosure of which is incorporated by reference. However, other poultry feeders may be used with a control unit constructed in accordance with the invention. The poultry feeder 10 receives granular feed through a horizontal feed conveyor or distribution tube 12 which commonly extends about one half the length of a poultry feeder or broiler house. The tube 12 receives a rotary auger 14 which is intermittently driven or rotated by an electric motor and gear reducer drive unit 15 located at an end of the house to move the feed from a supply hopper located within the center of the house axially within the tube 12 so that the feed exits or drops downwardly through a bottom hole 16 associated with each feeder connected to the tube.

Preferably, each poultry feeder 10 is constructed entirely of injection molded plastic parts or components and includes a vertical drop tube 18 having generally a square cross-sectional configuration and defining an arcuate recess 19 for receiving the delivery tube 12. A cap member 22 slides laterally or clips onto the upper portion of the drop tube 18 to secure the drop tube to the delivery or conveyor tube. A pair of ears 23 at the top of the cap member 22 are for receiving and locating an electrically charged wire for preventing the birds from roosting on the feed distribution tube 12, as shown in above mentioned U.S. Pat. No. 3,330,255, the disclosure of which is also incorporated by reference.

A set of linear gear teeth or racks 24 are integrally molded as part of the drop tube 18 on opposite side walls, and a tubular sleeve 26 receives the drop tube 18 and has opposite vertical channel portions 28 opposing the racks 24. Cross slots are formed within each channel portion 28 and receive a small pinion or spur gear 34 mounted on a shaft 36. The slots rotatably supports the shaft 36 and position the gear 34 so that it engages the corresponding rack 24. A tubular feed gate 40 is also molded of a plastics material and includes opposing channel portions 42 each of which has vertically spaced horizontal slots 43 so that the channel portions 42 form another pair of vertical racks which also receive the teeth on the pinions or gears 34.

A molded plastic grill 50 (FIG. 5) includes an upper annular hub portion 52 which is connected to the upper end portion of the tubular sleeve 26 by a pair of spring hooks (not shown) molded as integral parts of the sleeve 26. The hub portion 52 has a downwardly projecting wall around the drop tube 18 and which engages the top end of the sleeve 26 to lock the grill 50 to the sleeve 26. The grill 50 has circumferentially and angularly spaced ribs 62 (FIG. 5) which are integrally molded with the annular hub 52 and with a bottom connecting ring 64. The ring 64 is split at one location to provide for slightly collapsing the ring 64. A molded plastic feed pan 70 (FIG. 1) includes an upwardly projecting inner frusto-conical portion 72 surrounded by an outer frusto-conical portion 74. The outer portion 74 is surrounded by a channel-shaped rim portion 76 having an inwardly projecting upper annular lip 77. The feed pan 70 is attached to the grill 50 by slightly collapsing the ring portion 64 of the grill 50 and expanding it into the channel portion 76 of the feed pan 70.

An annular feed level control member 85 includes a tubular sleeve portion 87 which surrounds the feed gate 40. The sleeve portion 87 is adjustably connected to the feed gate by means of segmented threads 89 within the tubular sleeve portion 87 and external thread segments on the feed gate 40. A frustoconical skirt portion 92 is molded as an integral part of the control member 85 at the bottom of the tubular sleeve portion, 87, and a series of peripherally spaced tapered ribs or fins 94 project outwardly from the skirt portion 92.

In accordance with the present invention, a control unit 100 for the motor 15 is located within a circular hole or opening 102 of the feed pan 70 and includes a cup-shaped base housing 105 having a cylindrical wall 106 and a bottom wall 108 and molded of a semi-rigid plastics material. A set of four peripherally spaced ribs 111 (FIG. 1) are molded as an integral part of the cylindrical wall 106 and engaged the bottom surface of the feed pan portion 72 around the opening 102. A set of four circumferentially spaced tapered clips 113 are also molded as an integral part of the housing wall 106 and project outwardly to engage the upper surface of the pan wall 72 around the opening 102. The wall 106 of the housing 105 has sufficient flexibility to permit the tapered clips 113 to snap onto the pan wall 72 when the pan 70 is pressed downwardly onto the base housing 105.

The housing 105 is molded with an integral cylindrical hub portion 116 which has a lower bore or chamber 118 and an upper chamber 121 separated by an internally threaded wall portion 122. The chamber 121 slidably supports a center plunger portion 124 of a molded plastic inverted cone member 125 having an upwardly projecting center dome 127. The cone member 125 is covered by a thin molded latex or rubber-like membrane or diaphragm 130 which overlies the cone member 125 and has a lower cylindrical skirt portion 132 which extends around the clips 1 13 and through the center opening 102 of the feed pan 70. The skirt portion 132 is confined or pinched between the pan portion 72 and the housing wall 106.

The cone member 125 is supported by the center column or hub portion 116 of the housing 105 with the cylindrical plunger portion 124 freely slidable within the cylindrical chamber 121 so that the cone member 125 may move from an upper position (FIG. 2) to a lower position (FIG. 3) against the bias of a helical coil compression spring 136 surrounding a lower cylindrical stem portion 138 of the cone member 125. When the cone member 125 moves downwardly, the skirt portion 132 of the the flexible membrane or diaphragm bulges outwardly, as shown in FIG. 3.

A metal actuator in the form of a cap screw 142 has a head portion 143 with a hexagonal recess and extends through an externally threaded guide bushing 146 supported by the wall portion 122 of the housing 105. The screw 142 is threaded into the stem portion 138 of the cone member 125 and is adjustable within the stem portion for selecting the upper position of the cone member 125 and the compression of the spring 136. An induction type proximity sensor or switch 150 extends horizontally within a lower portion of the housing 105 and is retained by an integrally molded lug projection 152 having a bore or hole which receives the sensor 150. One type of solid state sensor which has provided satisfactory results is manufactured by Carlo Gavazzi in Italy and is sold under Model No. EI1204TBCSL. The proximity switch or sensor 150 has a set of flexible electrical conductors within a cord or line 154, and the conductors are connected to control the electric motor of the auger drive unit 15.

In operation, the poultry feeder 10 with the control unit 100 is located adjacent the end of the feed conveyor tube 12 where the auger 14 connects to the drive unit 15. The compression spring 138 is selected to urge the actuating cone 130 to its upper position (FIG. 2) where the head 143 of the screw 142 engages a shoulder within the housing hub portion 116 at the bottom of the threaded wall portion 122. When a predetermined volume and weight of poultry feed is collected on and is supported by the cone member 130 within the end feeder 10, the cone member commences to move downwardly in response to the weight of the collected feed. After a predetermined amount of feed is collected within the pan 70, and the cone member 130 is supporting a corresponding predetermined weight of feed, the cone member arrives at its lower actuating position (FIG. 3), where the head 143 of the actuating screw 142 is sensed by the proximity switch or sensor 150 which opens the electrical circuit to the motor of the auger drive unit 15. When the auger 14 stops, no additional feed is supplied to any of the feeders 10 connected to the feed conveyor tube 12.

As apparent from the drawings and the above description, a poultry feeder incorporating a feed conveyor control unit or system 100 constructed in accordance with the present invention, provides desirable features and advantages. For example, the control unit 100 is dependable in operation an does not require frequent maintenance or adjustment as normally required by control mechanisms which depend on a spring within or associated with a mechanical switch to determine the operating sensitivity of the control system. In addition, the inductive type proximity switch or sensor 150 is very reliable with respect to sensing the head 143 of the actuator screw 142 and requires no adjustment in the switch 150. The control unit 100 may also be easily and quickly attached to the pan of poultry feeders simply by cutting a circular hole 102 in the center portion of the pan and pressing the pan downwardly onto the control unit 100 until the pan wall passes over the spring clips 113. The control unit 100 may also be easily and quickly adjusted for changing the sensitivity of the control unit simply by lifting the feeder and inserting a wrench into the hole 118 within the bottom of the base housing 105 and adjusting the screw 142 within the stem portion 138 of the cone member 125. In addition, the flexible latex diaphragm 130 protects the components within the base housing 105 by assuring that none of the feed or dust enters the housing during movement of the cone member 125.

While the form of feeder control system or apparatus herein described constitutes a preferred embodiment of the invention, it is to be understood that the invention is not limited to this precise form of apparatus, and that changes may be made therein without departing from the scope and spirit of the invention as defined in the appended claims.

What is claimed is:

1. A poultry feeder adapted to be supported by a horizontally extending feed conveyor tube enclosing an auger driven by an electric motor, said feeder comprising a generally vertical drop tube adapted to be supported by and receive feed from the conveyor tube, a feed pan disposed under said drop tube for receiving feed from said drop tube, a grill member surrounding said drop tube and connected to said feed pan, a control unit connected to said pan and including a switch having electrical conductors adapted to be connected to the electric motor, said control unit including a feed sensing member supported under said drop tube for downward movement in response to a predetermined mass of feed on said sensing member, and an actuating member carried by said feed sensing member and positioned to actuate said switch at a lower position of said feed sensing member.

2. A poultry feeder as defined in claim 1 wherein said switch comprises an inductive type proximity switch, and said actuating member comprises a metal actuator carried by said feed sensing member and positioned to actuate said proximity switch when said feed sensing member moves to said lower position.

3. A poultry feeder as defined in claim 2 wherein said metal actuator comprises a screw adjustably connected to said feed sensing member.

4. A poultry feeder as defined in claim 1 wherein said control unit comprises a cup-shaped housing recessed within a center portion of said pan and having an upwardly projecting center hub portion, and said feed sensing member comprises an inverted cone member having a center stem portion supported for vertical movement by said hub portion of said housing.

5. A poultry feeder as defined in claim 4 and including a diaphragm overlying said cone member and having a flexible skirt portion connected to said housing.

6. A poultry feeder as defined in claim 4 wherein said housing and said cone member each comprises a molded plastics material.

7. A poultry feeder as defined in claim 4 wherein said switch comprises an inductive type proximity switch disposed within said housing, and said actuating member comprises an adjustable metal screw connected to said stem portion and disposed to actuate said switch when said cone member is in said lower position.

8. A poultry feeder as defined in claim 4 and including a compression spring extending between said hub portion of said housing and said stem portion of said cone member for urging said cone member upwardly to an upper position.

9. A poultry feeder as defined in claim 8 wherein said actuating member comprises a metal screw adjustably threaded into said stem portion of said cone member and projecting downwardly into a center bore within said hub portion of said housing, and the force exerted by said spring on said stem portion of said cone member is selected by adjusting said screw within said stem portion of said cone member.

10. A poultry feeder adapted to be supported by a horizontally extending feed conveyor tube enclosing an auger driven by an electric motor, said feeder comprising a generally vertical drop tube adapted to be supported by and receive feed from the conveyor tube, a feed pan disposed under said drop tube for receiving feed from said drop tube, a grill member surrounding said drop tube and connected to said feed pan, a control unit including a housing recessed within said pan, a switch within said housing and having electrical conductors adapted to be connected to the electric motor, a feed sensing member having a sloping top surface disposed under said drop tube and supported by said housing for downward movement in response to a predetermined mass of feed on said top surface of said sensing member, and an actuating member carried by said feed sensing member and positioned to actuate said switch at a lower position of said feed sensing member.

11. A poultry feeder as defined in claim 10 wherein said switch comprises an inductive type proximity switch, and said actuating member comprises a metal actuator carried by said feed sensing member and positioned to actuate said proximity switch when said feed sensing member moves to said lower position.

12. A poultry feeder as defined in claim 11 wherein said metal actuator comprises a screw adjustably connected to a downwardly projecting center stem portion of said feed sensing member.

13. A poultry feeder as defined in claim 10 wherein said housing is recessed within a center portion of said pan and includes an upwardly projecting center hub portion, and said feed sensing member includes a downwardly projecting center stem portion supported for vertical movement by said hub portion of said housing.

14. A poultry feeder as defined in claim 13 wherein said switch comprises an inductive type proximity switch disposed within said housing, and said actuating member comprises an adjustable metal screw connected to said stem portion and disposed to actuate said switch when said feed sensing member is in said lower position.

15. A poultry feeder as defined in claim 13 and including a compression spring extending between said hub portion of said housing and said stem portion of said feed sensing member for urging said feed sensing member upwardly to an upper position.

16. A poultry feeder as defined in claim 15 wherein said actuating member comprises a metal screw adjustably threaded into said stem portion of said feed sensing member and projecting downwardly into a tubular said hub portion of said housing, and the force exerted by said spring on said stem portion of said feed sensing member is selected by adjusting said screw within said stem portion of said cone member.

17. A poultry feeder as defined in claim 10 and including a diaphragm overlying said feed sensing member and having a flexible skirt portion connected to said housing.

18. A control unit for a poultry feed conveyor drive, comprising a base housing defining an open top chamber, an inverted cone member supported by said housing above said chamber for generally vertical movement relative to said housing and having a sloping top surface, a flexible diaphragm member extending between said cone member and said housing, a spring urging said cone member to an upper position, said cone member adapted to move downwardly in response to a collection of feed on said cone member, a switch disposed within said housing and adapted to control the feed conveyor drive, and an actuator connected to move downwardly with said cone member and position to actuate said switch in response to a predetermined amount of feed on said cone member.

19. A control unit as defined in claim 18 wherein said switch comprises an inductive type proximity switch, and said actuator comprises a metal actuator carried by said cone member and positioned to actuate said proximity switch when said cone member moves to a lower position.

20. A control unit as defined in claim 19 wherein said housing includes an upwardly projecting tubular hub portion, said cone member includes a downwardly projecting center stem portion supported for vertical movement by said hub portion of said housing, and said actuator comprises a metal screw extending upwardly within said hub portion and threaded into said stem portion of said cone member.

* * * * *